Nov. 15, 1927.          C. F. BROWN          1,649,149
CLAMPING DEVICE FOR BUMPER BARS AND THE LIKE
Filed March 4, 1926
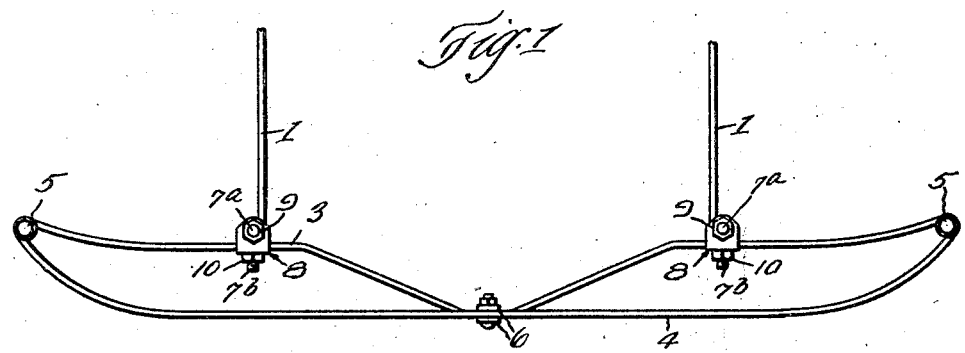
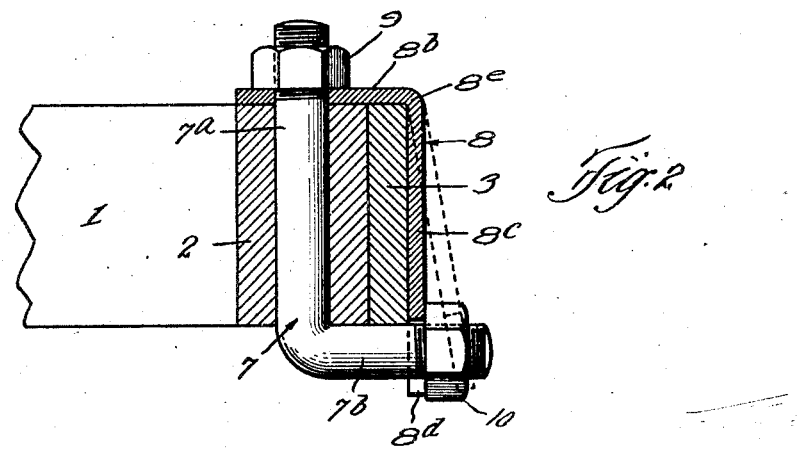
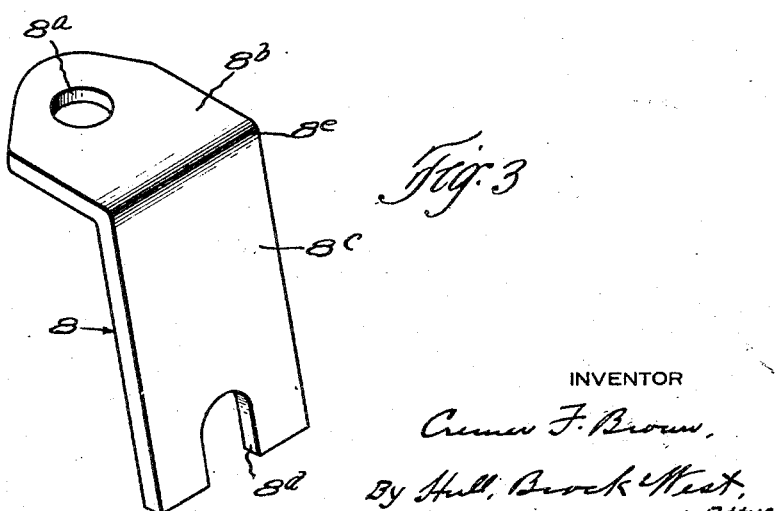
INVENTOR Patented Nov. 15, 1927.

1,649,149

UNITED STATES PATENT OFFICE.

CREMER F. BROWN, OF CLEVELAND, OHIO, ASSIGNOR TO THE C. G. SPRING & BUMPER COMPANY, OF DETROIT, MICHIGAN, A CORPORATION OF DELAWARE.

CLAMPING DEVICE FOR BUMPER BARS AND THE LIKE.

Application filed March 4, 1926. Serial No. 92,112.

This invention relates to clamping devices and, as shown herein, to devices which are employed for clamping bumpers for automobiles to their supporting arms.

It is the general purpose and object of the invention to provide a clamping device of this character which is capable of realizing the clamping function in an efficient manner and which will serve not only to clamp the bar in place but will also prevent rattling of the parts and the loosening of the nuts on the clamping bolts. A still further object of the invention is to provide a device of this kind which is extremely simple in construction and economical of production.

I accomplish the foregoing objects in and through the construction and arrangement of parts shown in the drawings, wherein Fig. 1 represents a plan view of a bumper showing the same secured to the ordinary supporting arms by use of my invention; Fig. 2 a sectional detail through the clamping device and the eye on the end of one of the bumper supporting arms; and Fig. 3 a perspective view of the clamping plate of the aforesaid device.

Describing the parts by reference characters, 1 denotes a pair of bumper-supporting arms secured at their rear or inner ends to the side members (not shown) of an automobile. Each of the arms 1 is provided at its front or outer end with an eye 2 to which there is secured, by one of my clamping devices, a bar 3 of a bumper, which bumper may be of any approved construction, the one shown herein being of the type shown in McGregor Patent No. 1,372,154, issued March 22, 1921 and comprising a rear or auxiliary bar connected at its ends to and between the ends of a pair of front or impact bars 4, the connections being effected by bolts 5 extending through aligned eyes on the bars 3 and 4. The central portion of the bar 3 is shown as projected toward and between and secured to the front or impact bars 4 by a suitable clamp 6. The bumper in its details constitutes no part of the invention intended to be protected hereby.

For the purpose of securing the bumper bar 3 to the arms 1; I employ a pair of clamping devices, one for each eye, each device comprising an angle bolt 7 and a resilient angle plate 8. The bolt 7 has a vertical branch or portion $7^a$ and a horizontal branch or portion $7^b$, and its opposite ends are threaded. The branch $7^a$ is of sufficient length to extend through the eye 2 and through an aperture $8^a$ in the upper portion $8^b$ of the angle plate, the upper part of the angle plate being clamped against the top of the eye by means of the nut 9.

The lower part or branch $7^b$ of the bolt extends forwardly or outwardly and beneath the eye 2 and the bumper bar 3. The lower end of the part $8^c$ of the angle plate is slotted, as indicated at $8^d$, for the reception of the lower branch of the bolt. The parts are so proportioned that, when the bolt is inserted through the eye 2 and the aperture $8^a$ in the clamping plate, the corner $8^e$ of the plate will engage the upper corner of the bar 3. It will be noted that the part $8^c$ of the clamping plate does not extend at right angles to the part $8^b$, but projects downwardly and forwardly from the part $8^b$, forming an obtuse angle therewith. As the plate is resilient, it follows that when the lower part or branch of the bolt 7 is inserted in the slot $8^d$ and the nuts 9 and 10 are set up, the ends of the plate will exert a yielding pressure against the nuts 9 and 10, thereby holding them against backing off and preventing the rattling of the parts. When both the nuts 9 and 10 are so set up, the bar 3 will be clamped securely and firmly against the eye 2 and will be confined between the said eye and the part $8^c$ of the clamping plate and between the top $8^b$ of said plate and the branch $7^b$ of the bolt.

The clamping device described herein is extremely simple in construction and economical of production, but is admirably adapted for the purpose of securing an effective means for securing bars to the eyes of supporting devices and particularly for securing bumper bars to the eyes on the ends of the supporting arms.

For convenience of description, the bumper will be assumed as applied to the front of the car, and the terms "front" and "rear" will be used in accordance with this assumption, but without any idea of limiting my invention to use with bumpers applied only to the fronts of automobiles, it being evident that it is equally applicable to bumpers applied to the rears of such vehicles.

Having thus described my invention, what I claim is:—

1. The combination, with an arm having an eye at the end thereof, of means for securing a bumper bar to said eye, the said means comprising an angular bolt one portion of which is adapted to extend through said eye and the other portion of which is adapted to extend beneath said eye, an angular clamping plate having a slot at one end for the reception of one portion of said bolt and an aperture through the other end for the reception of the other portion of said bolt, and nuts on the opposite ends of said bolt.

2. The combination, with an arm having an eye at the end thereof, of means for securing a bumper bar to said eye, the said means comprising an angular bolt one portion of which is adapted to extend through said eye and the other portion of which is adapted to extend beneath said eye, an angular clamping plate having an aperture adjacent each end for the reception of the corresponding portion of said bolt, and plate-engaging means on opposite ends of said bolt, one of said plate-engaging means being adjustable.

3. The combination, with an arm having an eye at the end thereof, of means for securing a bumper bar to said eye, the said means comprising an angular bolt one portion of which is adapted to extend through said eye and the other portion of which is adapted to extend across an end of said eye, an angular clamping plate having a slot at one end thereof for the reception of the end portion of one of the branches of said bolt and an aperture through the other end thereof for the end portion of the other branch of said bolt, and a nut on the portion of the bolt which extends through the said slot.

4. The combination, with an arm having an eye at the end thereof, of means for securing a bumper bar to said eye, the said means comprising an angular bolt one portion of which is adapted to extend through said eye and the other portion of which is adapted to extend across an end of said eye, an angular clamping plate having an elongated aperture adjacent one end thereof for the reception of the end of one of the branches of said bolt and an aperture adjacent the other end thereof for the end portion of the other branch of said bolt, and plate-engaging means on opposite ends of said bolt, one of such plate-engaging means being adjustable.

5. The combination, with an arm having an eye at the end thereof, of means for securing a bumper bar thereto, said means comprising an angular bolt having a pair of branches arranged at substantially right angles to each other, both ends of the bolt being threaded, an angular clamping plate one portion of which is provided with an aperture therethrough for the said bolt and the other portion of which is provided with a slot at the end thereof for the reception of the other branch of said bolt, and nuts on the ends of said bolt for drawing one part of the plate in engagement with an end of the eye and the other part of the said plate against the face of the bumper bar which is remote from the said eye.

6. The combination, with an arm having an eye at the end thereof, of means for securing a bumper bar thereto, said means comprising an angular bolt having a pair of branches arranged at substantially right angles to each other, a resilient angle plate having one portion adapted to extend across one end of said eye and one edge of said bar and the other portion forming an obtuse angle with the first-mentioned portion, the said plate being provided with an aperture adjacent each end thereof, one of said apertures being elongated, and plate-engaging means on opposite ends of said bolt, one of said plate-engaging means being adjustable for securing one portion of the plate in engagement with an end of the eye and the other portion of the said plate against the face of the bumper bar which is remote from the said eye.

7. The combination, with an arm having an eye at the end thereof, of means for securing a bumper bar thereto, the said means comprising an angular bolt one branch of which is adapted to extend through said eye and the other branch of which is adapted to extend beneath said eye, a resilient angle plate having an aperture in the upper portion thereof for the reception of the upper end of the bolt and having a slot in the lower end thereof for the reception of the lower end of said bolt, the lower part or branch of the said plate extending downwardly and forwardly from the upper portion thereof, and nuts on the opposite ends of said bolt for drawing the upper branch of the clamping plate into engagement with the top of the eye and the top of the bumper bar and for drawing the lower member or branch of the clamping plate into engagement with the front face of the said bar.

8. The combination, with an arm having an eye at the end thereof, of means for securing a bumper bar thereto, the said means comprising an angular bolt one branch of which is adapted to extend through said eye and the other branch of which is adapted to extend across said eye, a resilient angle plate having apertures in the end portions thereof for the reception of corresponding ends of the bolt, the lower part or branch of the said plate extending downwardly and forwardly from the upper portion thereof, and plate-engaging means on the opposite ends of said bolt one of such plate-engaging means being adjustable.

9. The combination, with an arm having an eye at the end thereof, of means for securing a bumper bar thereto, the said means comprising an angular bolt one branch of which is adapted to extend through said eye and the other branch of which is adapted to extend across the said eye, a resilient angle plate having a portion adapted to be secured against an end of said eye and an edge of the said bar and a portion extending forwardly from the first mentioned portion and having a slot in the end thereof adapted to receive the forwardly projecting portion or branch of the said bolt, the said clamping plate being of resilient metal, and nuts on said bolt for securing the plate in place with the first mentioned portion thereof in engagement with the cooperating end of the eye and edge of the bar and with the other portion in engagement with the front face of the said bar.

10. The combination, with an arm having an eye at the end thereof, of means for securing a bumper bar thereto, the said means comprising an angular bolt one branch of which is adapted to extend through said eye and the other branch of which is adapted to extend across the said eye, a resilient angle plate having a portion adapted to be secured against an end of said eye and an edge of the said bar and a portion extending at nearly right angles from the first mentioned portion, the said plate having an aperture adjacent each end thereof for the cooperating portions of said bolt, respectively, and plate-engaging means on opposite ends of said bolt, one of such plate-engaging means being adjustable thereby to secure the plate in place with the first mentioned portion thereof in engagement with the cooperating end of the eye and edge of the bar and with the other portion in engagement with the front face of the said bar.

11. The combination, with an arm having an eye at the end thereof, of means for securing a bumper bar to said eye, the said means comprising an angular bolt one portion of which is adapted to extend through said eye and the other portion of which is adapted to extend beneath said eye, an angular clamping plate having an aperture adjacent each end for the reception of the corresponding portion of said bolt, and plate-engaging means on opposite ends of said bolt.

12. The combination, with an arm having an eye at the end thereof, of means for securing a bumper bar to said eye, the said means comprising an angular bolt one portion of which is adapted to extend through said eye and the other portion of which is adapted to extend beneath said eye, an angular clamping plate having an aperture adjacent each end for the reception of the corresponding portion of said bolt, and plate-engaging means on opposite ends of said bolt, both of said plate-engaging means being adjustable.

13. The combination, with an arm having an eye at the end thereof, of means for securing a bumper bar to said eye, the said means comprising an angular bolt one portion of which is adapted to extend through said eye and the other portion of which is adapted to extend across an end of said eye, an angular clamping plate having an elongated aperture adjacent one end thereof for the reception of the end of one of the branches of said bolt and an aperture adjacent the other end thereof for the end portion of the other branch of said bolt, and plate-engaging means on opposite ends of said bolt, both of such plate-engaging means being adjustable.

14. The combination, with an arm having an eye at the end thereof, of means for securing a bumper bar thereto, said means comprising an angular bolt having a pair of branches arranged at substantially right angles to each other, a resilient angle plate having one portion adapted to extend across one end of said eye and one edge of said bar and the other portion forming an obtuse angle with the first-mentioned portion, the said plate being provided with an aperture adjacent each end thereof, one of said apertures being elongated, and plate-engaging means on opposite ends of said bolt, both of said plate-engaging means being adjustable for securing one portion of the plate in engagement with an end of the eye and the other portion of the said plate against the face of the bumper bar which is remote from the said eye.

15. The combination, with an arm having an eye at the end thereof, of means for securing a bumper bar thereto, the said means comprising an angular bolt one branch of which is adapted to extend through said eye and the other branch of which is adapted to extend across said eye, a resilient angle plate having apertures in the end portions thereof for the reception of corresponding ends of the bolt, the lower part or branch of the said plate extending downwardly and forwardly from the upper portion thereof, and plate-engaging means on the opposite ends of said bolt, both of such plate-engaging means being adjustable.

16. The combination, with an arm having an eye at the end thereof, of means for securing a bumper bar thereto, the said means comprising an angular bolt one branch of which is adapted to extend through said eye and the other branch of which is adapted to extend across the said eye, a resilient angle plate having a portion adapted to be secured against an end of said eye and an edge of the said bar and a portion extending at nearly right angles from the first mentioned portion, the said plate having an aperture adjacent each end thereof for the cooperating portions of said bolt, respectively, and plate-engaging means on opposite ends of said bolt, both of such plate-engaging means being adjustable thereby to secure the plate in place with the first mentioned portion thereof in engagement with the cooperating end of the eye and edge of the bar and with the other portion in engagement with the front face of the said bar.

In testimony whereof, I hereunto affix my signature.

CREMER F. BROWN.